United States Patent
Sekiguchi et al.

(10) Patent No.: US 10,960,945 B2
(45) Date of Patent: Mar. 30, 2021

(54) DEVICE CAPABLE OF TRAVELING ON WALL SURFACE WHILE ADHERING THERETO

(71) Applicant: Panasonic Intellectual Property Management Co., Ltd., Osaka (JP)

(72) Inventors: Tomohiro Sekiguchi, Kanagawa (JP); Yoshinari Matsuyama, Osaka (JP); Tomomi Nishikata, Ishikawa (JP); Masaki Shikanai, Kanagawa (JP); Takeshi Kikuchi, Osaka (JP); Shogo Mikami, Miyagi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 59 days.

(21) Appl. No.: 16/580,192

(22) Filed: Sep. 24, 2019

(65) Prior Publication Data
US 2020/0017151 A1 Jan. 16, 2020

Related U.S. Application Data

(63) Continuation of application No. PCT/JP2018/006977, filed on Feb. 26, 2018.

(30) Foreign Application Priority Data

Mar. 29, 2017 (JP) .............................. JP2017-065964

(51) Int. Cl.
*B62D 57/024* (2006.01)
*B62D 55/26* (2006.01)

(52) U.S. Cl.
CPC ........... *B62D 57/024* (2013.01); *B62D 55/26* (2013.01)

(58) Field of Classification Search
CPC .................................................. B62D 57/024
See application file for complete search history.

(56) References Cited

U.S. PATENT DOCUMENTS

| | | | | |
|---|---|---|---|---|
| 6,964,312 | B2 * | 11/2005 | Maggio | B62D 49/0635 15/340.1 |
| 8,413,747 | B2 * | 4/2013 | Beard | B62D 55/108 180/9.1 |
| 2020/0079447 | A1 * | 3/2020 | Ohashi | B62D 57/024 |

FOREIGN PATENT DOCUMENTS

| | | |
|---|---|---|
| JP | 62-279176 | 12/1987 |
| JP | 11-171063 | 6/1999 |

(Continued)

OTHER PUBLICATIONS

International Search Report dated Apr. 17, 2018 in International (PCT) Application No. PCT/JP2018/006977.

*Primary Examiner* — Kevin Hurley
(74) *Attorney, Agent, or Firm* — Wenderoth, Lind & Ponack, L.L.P.

(57) ABSTRACT

A wall surface suction-type travel device includes a main body, a cushion, a plurality of support wheels, a crawler, and a drive source. The main body includes a wall-surface facing section and a draw-in port. The cushion is disposed on the wall-surface facing section of the main body and surrounding an edge of the draw-in port. The cushion is elastically deformable and has a slide surface sliding on the wall surface when the wall surface suction-type travel device travels on the wall surface. The plurality of support wheels are disposed on the main body. The crawler is an endless belt suspended on the plurality of the support wheels. The crawler has a grip surface put into contact with the wall surface when the wall surface suction-type travel device travels on the wall surface. The drive source is to rotate the crawler.

8 Claims, 7 Drawing Sheets

(56) References Cited

FOREIGN PATENT DOCUMENTS

JP         2016-84118      5/2016
JP       2018103781 A  *  7/2018  ........... B62D 55/253

* cited by examiner

DEVICE CAPABLE OF TRAVELING ON WALL SURFACE WHILE ADHERING THERETO

TECHNICAL FIELD

The present disclosure relates to a wall surface suction-type travel device configured to travel on a wall surface while being suctioned on the wall surface.

BACKGROUND ART

It is known that a wall surface suction-type travel device as is described in PTL 1 is, for example, configured to travel on a wall surface while being suctioned on the wall surface.

CITATION LIST

Patent Literature

PTL 1: Unexamined Japanese Patent Publication No. 2016-84118

SUMMARY

There is a need for a wall surface suction-type travel device configured to travel on a curved wall surface as well as a flat wall surface.

The present disclosure provides a wall surface suction-type travel device configured to travel on a curved wall surface while being suctioned on the curved wall surface.

According to an aspect of the present disclosure accomplished to solve the challenge described above, a wall surface suction-type travel device is provided as following:

The wall surface suction-type travel device is configured to travel on a wall surface while being suctioned on the wall surface.

The wall surface suction-type travel device includes:

a main body that has a wall-surface facing section and a draw-in port, the wall-surface facing section facing the wall surface when the wall surface suction-type travel device travels on the wall surface, the draw-in port being formed in the wall-surface facing section and being connected to a suction device;

a cushion disposed on the wall-surface facing section of the main body and surrounding an edge of the draw-in port, the cushion being elastically deformable and having a slide surface sliding on the wall surface when the wall surface suction-type travel device travels on the wall surface;

a plurality of support wheels disposed on the main body;

a crawler that is an endless belt suspended on the plurality of support wheels, the crawler having a grip surface put into contact with the wall surface when the wall surface suction-type travel device travels on the wall surface; and a drive source to rotate the crawler, wherein the slide surface of the cushion is at a more outer position than a position of the grip surface of the crawler in the wall surface suction-type travel device when the wall surface suction-type travel device is separated from the wall surface and is under no strain.

A wall surface suction-type travel device according to the present disclosure is configured to travel on a curved wall surface while being suctioned on the curved wall surface.

DESCRIPTION OF EMBODIMENT

Figure 1:
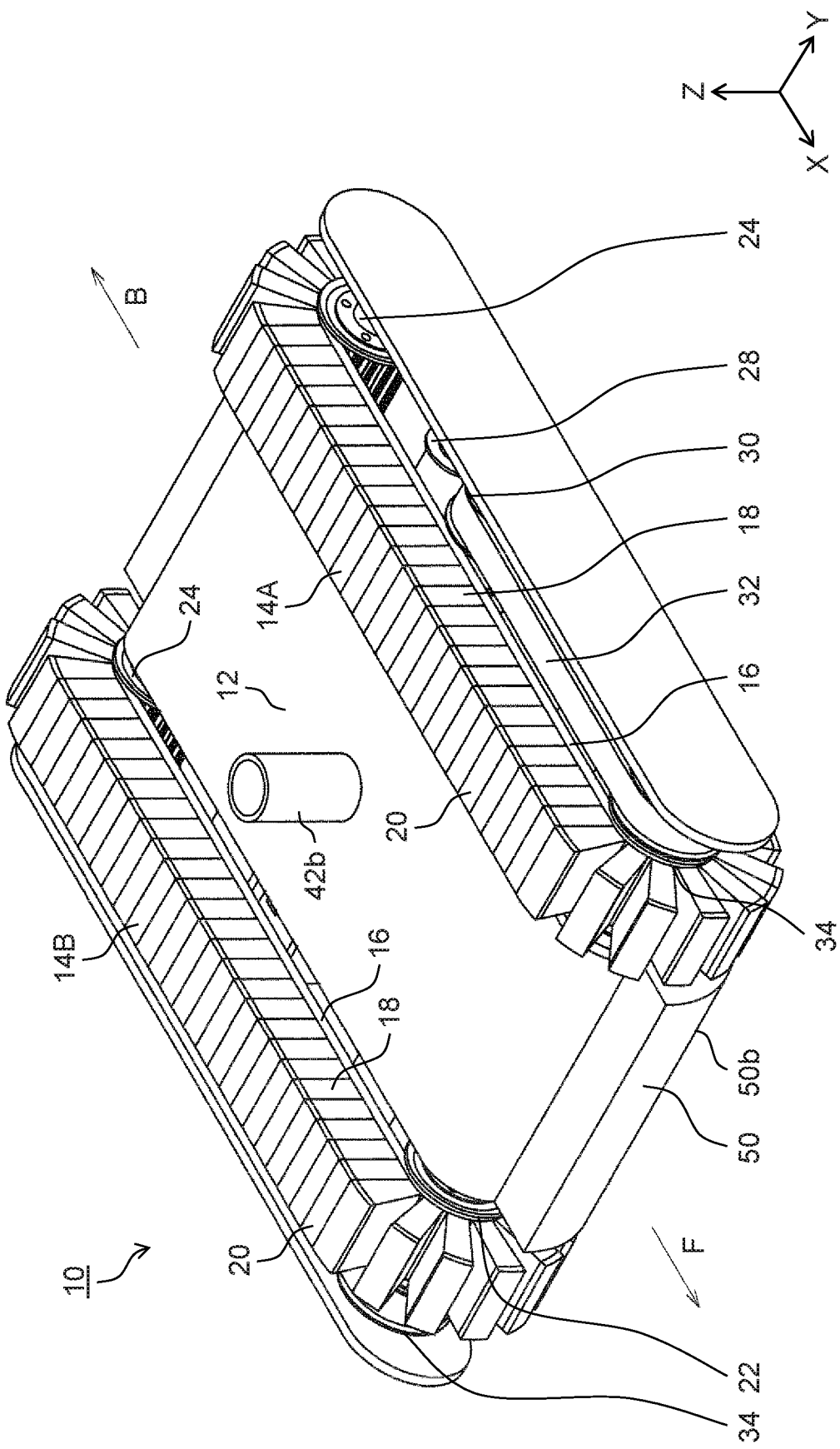
FIG. 1 is a perspective view of a wall surface suction-type travel device according to an exemplary embodiment of the present disclosure.

A wall surface suction-type travel device according to an aspect of the present disclosure is configured to travel on a wall surface while being suctioned on the wall surface. The wall surface suction-type travel device includes a main body, a cushion, a plurality of support wheels, a crawler, and a drive source. The main body includes a wall-surface facing section and a draw-in port. The wall-surface facing section faces the wall surface when the wall surface suction-type travel device travels on the wall surface. The draw-in port is formed in the wall-surface facing section and is connected to a suction device. The cushion is disposed on the wall-surface facing section of the main body and surrounding an edge of the draw-in port. The cushion is elastically deformable and has a slide surface sliding on the wall surface when the wall surface suction-type travel device travels on the wall surface. The plurality of support wheels are disposed on the main body. The crawler is an endless belt suspended on the plurality of the support wheels. The crawler has a grip surface put into contact with the wall surface when the wall surface suction-type travel device travels on the wall surface. The drive source is to rotate the crawler. The slide surface of the cushion is at a more outer position than a position of the grip surface of the crawler in the wall surface suction-type travel device when the wall surface suction-type travel device is separated from the wall surface and is under no strain.

This configuration enables the wall surface suction-type travel device to travel on a curved wall surface while being suctioned on the curved wall surface.

The crawler is, for example, elastically deformable in a thickness direction. Thus, the crawler provides increased grip force to grip the wall surface. The crawler elastically deforms in the thickness direction and thereby allows the cushion to be put into contact with the wall surface in a larger area of contact. This enables the wall surface suction-type travel device to stick to the wall surface with increased reliability.

An elastic modulus of the cushion is, for example, lower than an elastic modulus of the crawler. This configuration enables the wall surface suction-type travel device to travel on the wall surface with improved smoothness while being suctioned on the wall surface.

For instance, the crawler includes a base belt suspended on the plurality of the support wheels, a first elastic layer disposed on the base belt, and a second elastic layer being disposed on the first elastic layer and being put into contact with the wall surface. An elastic modulus of the first elastic layer is higher than an elastic modulus of the second elastic layer. This configuration provides satisfactory grip force to grip the wall surface and satisfactory propulsion.

The first elastic layer is, for example, greater in thickness than the second elastic layer. This configuration provides propulsion more satisfactorily.

Each of the first elastic layer and the second elastic layer of the crawler is, for example, divided into a plurality of parts arranged along a direction in which the crawler is elongated. This configuration allows the crawler to have decreased contraction force as compared with a crawler including first and second elastic layers that are each continuous without division in the elongated direction of the crawler. This enables the plurality of the support wheels suspending the crawler to smoothly rotate.

For instance, the cushion has a front end part and a rear end part that are opposed to each other in a direction along which the wall surface suction-type travel device travels. The cushion has a front inclined surface at the front end part. The front inclined surface is inclined relative to the wall surface such that the front inclined surface is farther away from the wall surface as closer to a front distal end of the cushion. The cushion has a rear inclined surface at the rear end part. The rear inclined surface is inclined relative to the wall surface such that the rear inclined surface is farther away from the wall surface as closer to a rear distal end of the cushion. This configuration allows the cushion to avoid getting caught on any projection on the wall surface and thus get over the projection if unevenness exists on the wall surface. Hence, the wall surface suction-type travel device is able to smoothly travel on the wall surface having unevenness.

The draw-in port of the main body is, for example, connected via a flexible hose with the suction device disposed separately from the wall surface suction-type travel device. The separate suction device contributes to a reduction in weight of the wall surface suction-type travel device as compared with a suction device mounted on a wall surface suction-type travel device. As a result, with identical suction force, the lighter wall surface suction-type travel device can stick to the wall surface with increased firmness.

The draw-in port of the main body is, for example, connected to the suction device mounted on the main body. This configuration eliminates the need for a flexible hose used to connect a wall surface suction-type travel device to a suction pump separate from the wall surface suction-type travel device. As a result, the wall surface suction-type travel device provides increased flexibility in traveling.

An exemplary embodiment will be described in detail below with reference to the drawings as appropriate. However, detailed description more than necessary may be omitted. For example, detailed description of well-known matters and redundant description of structures that are substantially the same may be omitted. This is to avoid unnecessary redundancy in the following description and to facilitate understanding by those skilled in the art.

Note that the inventors provide the accompanying drawings and the description below to help those skilled in the art to fully understand the present disclosure, and do not intend to use the accompanying drawings or the description below to limit the subject matter described in the claims.

Figure 2:
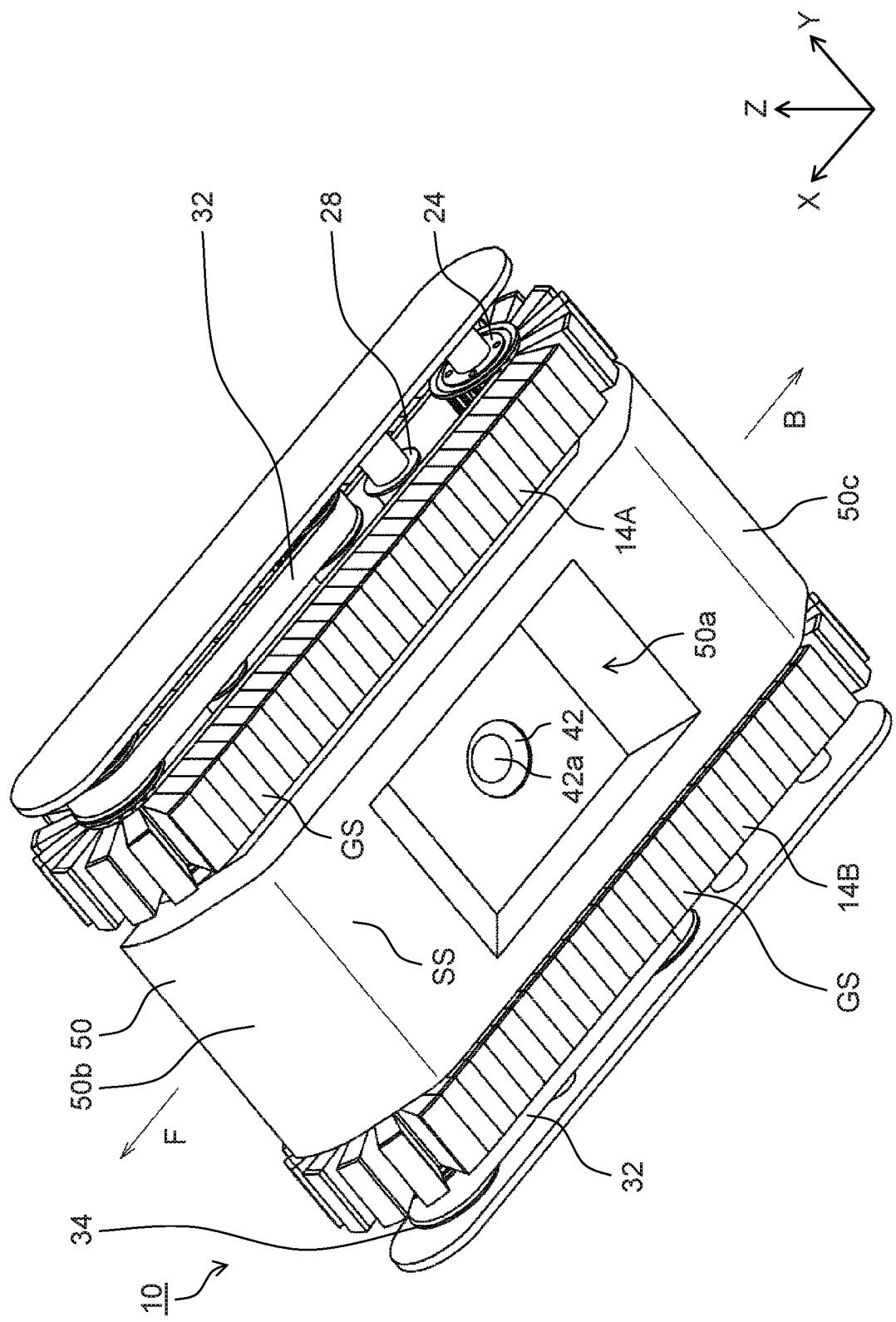
FIG. 2 is a perspective view of the wall surface suction-type travel device according to the exemplary embodiment, viewed along a different direction.
Figure 3:
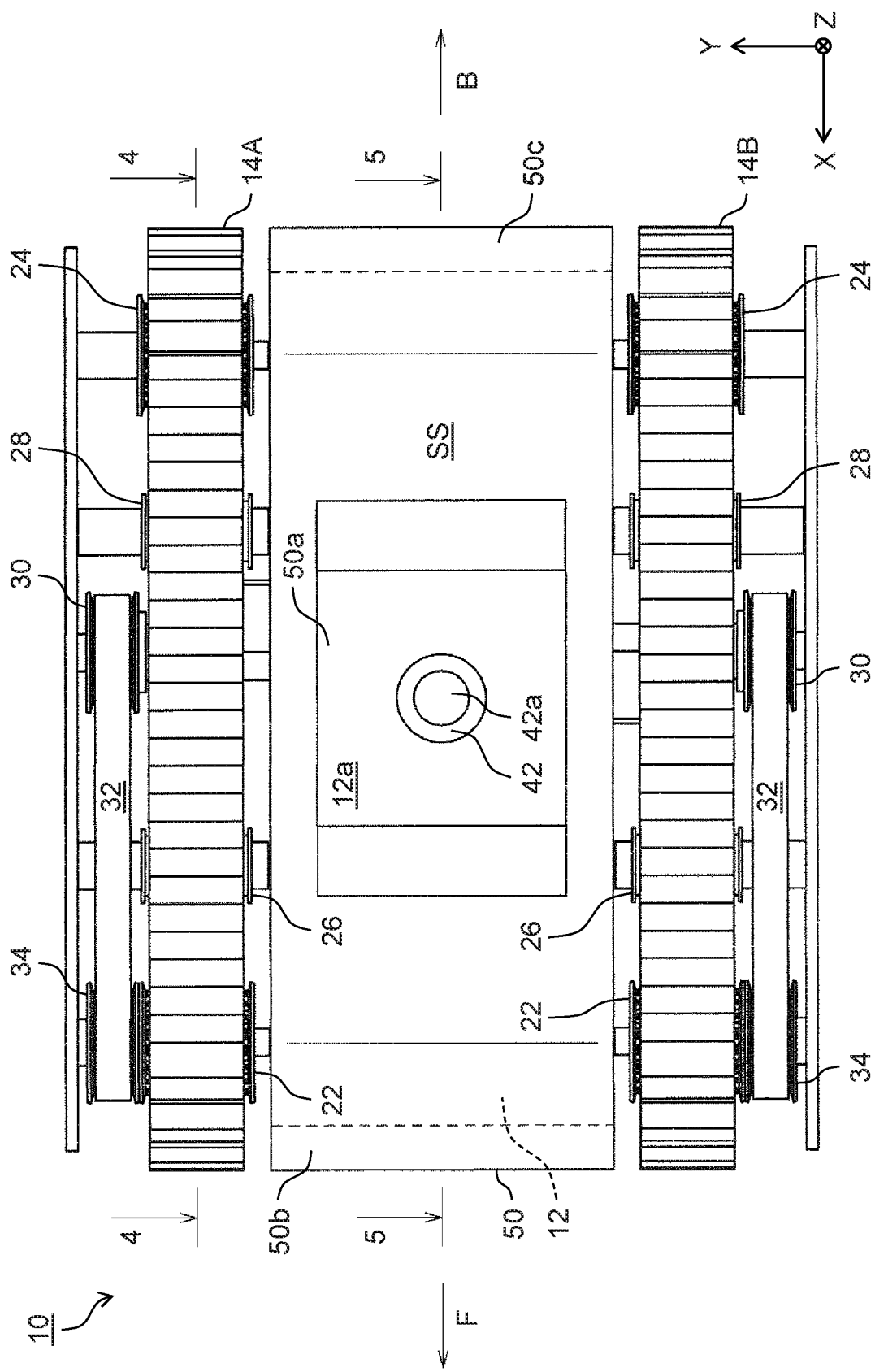
FIG. 3 is a plan view of the wall surface suction-type travel device according to the exemplary embodiment, viewed at a side configured to be suctioned on a wall surface.
Figure 4:
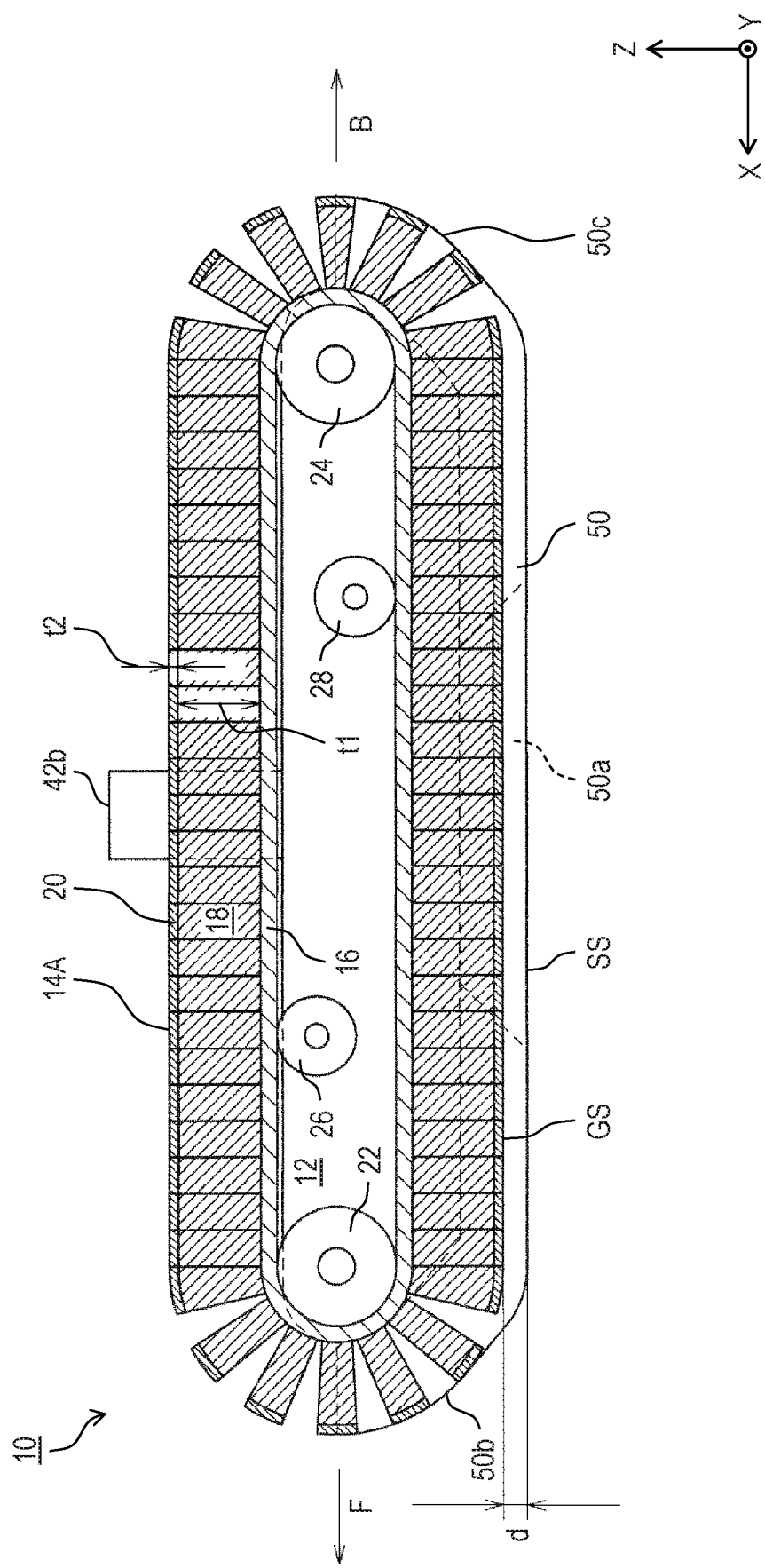
FIG. 4 is a partial cross-sectional view taken along line 4-4 of FIG. 3.
Figure 5:
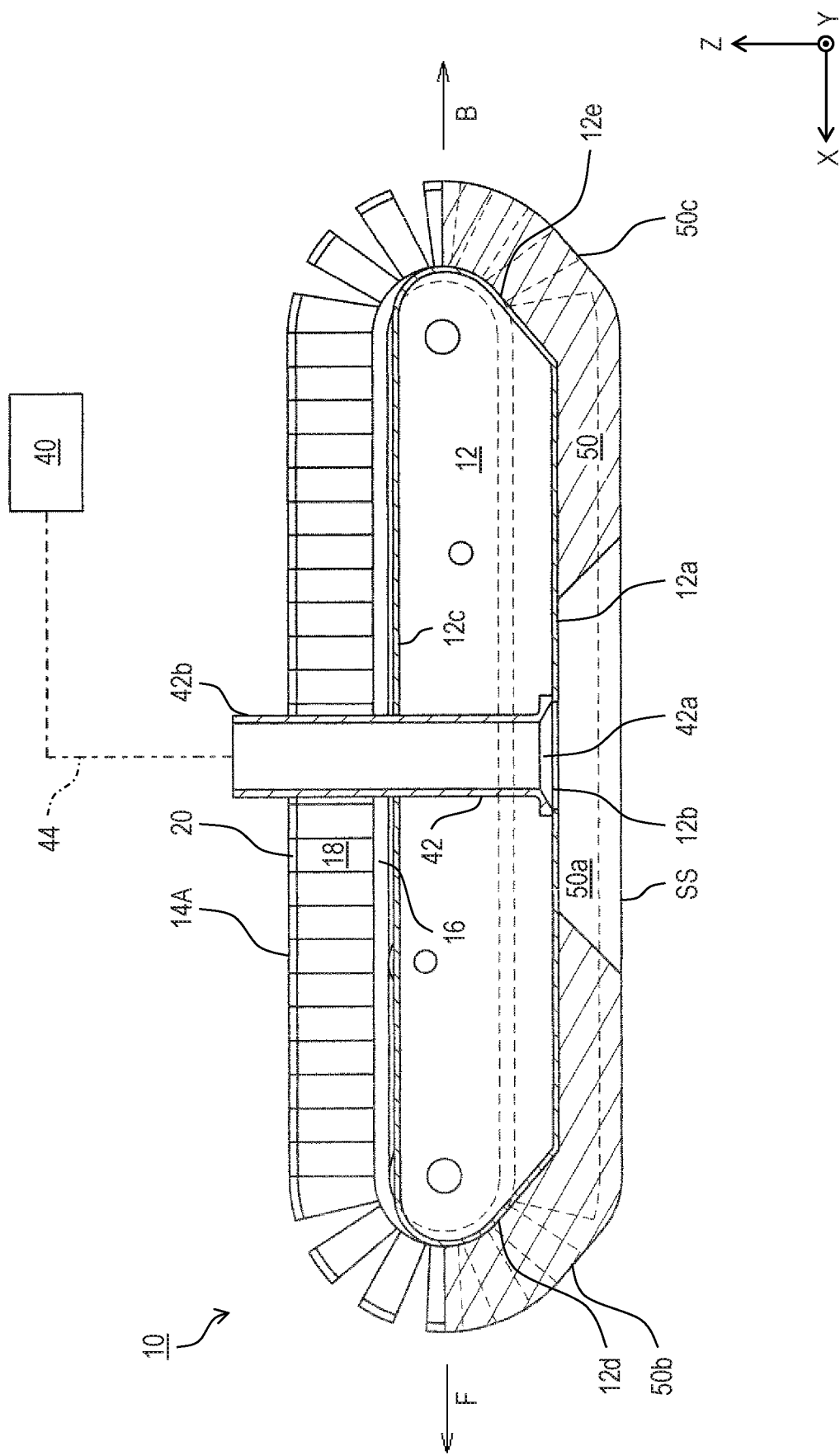
FIG. 5 is a partial cross-sectional view taken along line 5-5 of FIG. 3.

FIGS. 1 and 2 illustrate a wall surface suction-type travel device according to the exemplary embodiment of the present disclosure. FIG. 3 illustrates the wall surface suction-type travel device viewed at a side that is configured to be suctioned on a wall surface. FIG. 4 is a cross-sectional view taken along line 4-4 of FIG. 3. FIG. 5 is a cross-sectional view taken along line 5-5 of FIG. 3.

An X-Y-Z orthogonal coordinate system shown in each of the drawings is provided to help understanding of the present disclosure and is not intended to limit the present disclosure. An X-axis direction, a Y-axis direction, and a Z-axis direction in the drawings are orthogonal to one another. The X-axis direction represents a direction along which the wall surface suction-type travel device moves forward or backward. The Y-axis direction represents a width direction, and the Z-axis direction represents a thickness direction.

For convenience sake, direction F shown in the drawings represents a direction in which wall surface suction-type travel device 10 moves forward, and direction B represents a direction in which the wall surface suction-type travel device moves backward.

Wall surface suction-type travel device 10 shown in FIGS. 1 and 2 is a device configured to travel on a wall surface while being suctioned on the wall surface. Surfaces on which the device is configured to travel are not limited to wall surfaces. Wall surface suction-type travel device 10 is also configured to travel on a ceiling surface and a floor surface.

As shown in FIGS. 1 and 2, wall surface suction-type travel device 10 includes main body 12, and first crawler 14A and second crawler 14B disposed at both sides of main body 12 in a width direction (the Y-axis direction) to travel on a wall surface.

Main body 12 of wall surface suction-type travel device 10 is a housing having a substantially rectangular parallelepiped shape and being made of a lightweight metallic material such as aluminum. As described in detail later, main body 12 includes draw-in port 42a to be suctioned onto a wall surface, cushion 50, a motor and a battery to drive first and second crawlers 14A and 14B, and a control circuit board to control the motor. Main body 12 is equipped with a device according to a use to which wall surface suction-type travel device 10 is put. For instance, main body 12 is equipped with a camera if wall surface suction-type travel device 10 is used for photographing a wall surface. The control circuit board, the battery, and other parts may be disposed separately from wall surface suction-type travel device 10. In this case, control signals are sent to devices (e.g., the motor) in wall surface suction-type travel device 10 by wired or wireless communication. Electricity is supplied from the battery to wall surface suction-type travel device 10 through an electric cable or other means.

As shown in FIG. 3, first and second crawlers 14A and 14B are disposed at both sides of main body 12 in the width direction (the Y-axis direction). First and second crawlers 14A and 14B are substantially identical in configuration. Thus, first crawler 14A will be primarily described, and description of second crawler 14B will be omitted.

As shown in the cross-sectional view of FIG. 4, first crawler 14A is an endless belt that is, in this exemplary embodiment, configured to elastically deform in a thickness direction in response to contact with the wall surface when wall surface suction-type travel device 10 travels on the wall surface.

Specifically, in this exemplary embodiment, as shown in FIG. 4, first crawler 14A includes endless base belt 16, first elastic layer 18 disposed on base belt 16 (on an external surface of the base belt), and second elastic layer 20 disposed on first elastic layer 18.

Base belt 16 of first crawler 14A is an endless belt made, for example, of an elastic material such as rubber.

First elastic layer 18 disposed on base belt 16 is an elastically deformable layer that is, for example, made of an elastic foam material.

Second elastic layer 20 disposed on first elastic layer 18 is an elastically deformable layer that is, for example, made of an elastic foam material. Second elastic layer 20 is an outermost layer of first crawler 14A put into contact with the wall surface when wall surface suction-type travel device 10 travels on the wall surface.

In this exemplary embodiment, as shown in FIG. 4, thickness t1 of first elastic layer 18 is greater than thickness t2 of second elastic layer 20. First elastic layer 18 is higher than second elastic layer 20 in elastic modulus. A reason for these will be described later.

The "elastic modulus" described herein is a physical property value of the substance that indicates a substance's resistance to being deformed when a stress is applied to the substance. A material with a higher elastic modulus has a higher resistance to deformation. Specific examples of the elastic modulus indicating such resistant to deformation include Young's modulus, which is the ratio of stress applied along an axis to strain along the same axis, and 25% compression load deflection, which is defined as a load (MPa) required to compress a material in a direction such that the material gets 25% smaller in size in the compression direction.

As shown in FIGS. 3 and 4, main body 12 is provided with a plurality of support pulleys (support wheels) 22, 24 to support first crawler 14A and maintain first crawler 14A in a shape being elongated along the forward and backward direction (the X-axis direction).

Specifically, as shown in FIGS. 3 and 4, first crawler 14A (base belt 16 of the first crawler) is suspended on and supported by front support pulley 22 and rear support pulley 24 that are each freely rotatable about a center rotation axis extending in the width direction (the Y-axis direction). Main body 12 is also provided with secondary pulleys 26, 28 that are each freely rotatable and put into contact with an internal surface of base belt 16 such that a portion of first crawler 14A between front and rear support pulleys 22 and 24 is not slacked inward.

Main body 12 is provided with driving pulley 30, power transmission belt 32, and driven pulley 34 to drive first crawler 14A supported by front and rear support pulleys 22 and 24.

Driving pulley 30 is rotated by a drive source (not shown) such as a motor included in main body 12. Driven pulley 34 is attached to an outside of front support pulley 22 in the width direction (the Y-axis direction) and is rotated about the center rotation axis of front support pulley 22. Power transmission belt 32 is suspended on and supported by driving pulley 30 and driven pulley 34.

In response to rotation of driving pulley 30 by the motor or another drive source, the rotation of the driving pulley is transmitted to driven pulley 34 through power transmission belt 32. This causes driven pulley 34 and front support pulley 22 to rotate together. As a result, first crawler 14A suspended on front support pulley 22 rotates.

When first crawler 14A and second crawler 14B in contact with a wall surface rotate in an identical direction, wall surface suction-type travel device 10 travels on the wall surface forward or backward. When first and second crawlers 14A and 14B rotate in opposing directions, wall surface suction-type travel device 10 turns right or left on the wall surface.

In this exemplary embodiment, as shown in FIG. 4, first and second elastic layers 18 and 20 of first crawler 14A are divided into a plurality of parts along a direction in which first crawler 14A extends (rotates). For instance, first crawler 14A has a plurality of cuts that each extend across the width direction (the Y-axis direction) and reach base belt 16 in the thickness direction. The cuts are formed at regular intervals along the direction in which first crawler 14A is elongated.

From another point of view, external ends of a plurality of rectangular parallelepiped blocks of the first elastic layer are provided with pieces of the second elastic layer, and internal ends of the rectangular parallelepiped blocks of the first elastic layer are attached to the external surface of base belt 16 such that the rectangular parallelepiped blocks are arranged along a direction in which base belt 16 is elongated.

This configuration allows first crawler 14A to have decreased contraction force as compared with a first crawler including first and second elastic layers 18 and 20 that are each continuous and endless without division. Thus, force of first crawler 14A acting on front and rear support pulleys 22 and 24 decreases. This enables front and rear support pulleys 22 and 24 to smoothly rotate such that rotation force is transmitted from the drive source to first crawler 14A with a slight loss. First and second elastic layers 18 and 20 may be each continuous (endless), with proviso that front and rear support pulleys 22 and 24 are allowed to smoothly rotate.

As shown in FIG. 5, suction device 40 is provided to enable wall surface suction-type travel device 10 to stick to the wall surface by being suctioned on the wall surface.

In this exemplary embodiment, suction device 40 such as a suction pump designed to enable the wall surface suction-type travel device to be suctioned on the wall surface is connected to main body 12 via suction nozzle 42 installed into main body 12 and flexible hose 44.

Suction device 40 is disposed separately from wall surface suction-type travel device 10. Suction nozzle 42 is installed into main body 12, and draw-in port 42a of suction nozzle 42 opens at wall-surface facing section 12a, a part of the main body facing the wall surface while the travel device is traveling and being suctioned on the wall surface. Specifically, draw-in port 42a of suction nozzle 42 is connected to through hole 12b formed in wall-surface facing section 12a. Suction nozzle 42 has joint 42b to connect with suction device 40 disposed outside. Joint 42b passes through main body 12 and is located at top-surface section 12c of main body 12 (a part of main body 12 opposite to wall-surface facing section 12a in the thickness direction (the Z-axis direction)). Draw-in port 42a is not necessarily required to open so as to face the wall surface, with proviso that the wall surface suction-type travel device is allowed to be suctioned on the wall surface. For instance, a direction in which the draw-in port opens at wall-surface facing section 12a may be parallel to the wall surface.

Suction device 40 allows wall surface suction-type travel device 10 to be suctioned on the wall surface facing draw-in port 42a by drawing air through suction nozzle 42. This enables the wall surface suction-type travel device to stick to the wall surface.

Suction device 40 is disposed separately from wall surface suction-type travel device 10. This configuration contributes to a reduction in weight of wall surface suction-type travel device 10. This in turn enables wall surface suction-type travel device 10 to firmly stick to the wall surface.

As shown in FIGS. 1 to 5, main body 12 is provided with cushion 50 to allow the wall surface suction-type travel device to be suctioned on the wall surface with increased reliability.

Cushion 50 is elastically deformable and is, for example, made of an elastic foam material. As shown in FIG. 5, cushion 50 extends in the forward and backward direction (the X-axis direction) of wall surface suction-type travel device 10 and is attached to main body 12 so as to cover wall-surface facing section 12a, a part of front end 12d, and a part of rear end 12e of main body 12.

As shown in FIG. 2, cushion 50 is disposed on wall-surface facing section 12a and surrounding an edge of draw-in port 42a of suction nozzle 42 at wall-surface facing section 12a. Specifically, cushion 50 has through hole 50a that passes through along the thickness direction (the Z-axis direction). Draw-in port 42a is allowed to face the wall surface through through hole 50a.

While wall surface suction-type travel device 10 is traveling and being suctioned on the wall surface, cushion 50 is interposed between main body 12 and the wall surface and seals a gap between main body 12 and the wall surface while sliding on the wall surface. In other words, cushion 50 functions as a sealant.

Figure 6:
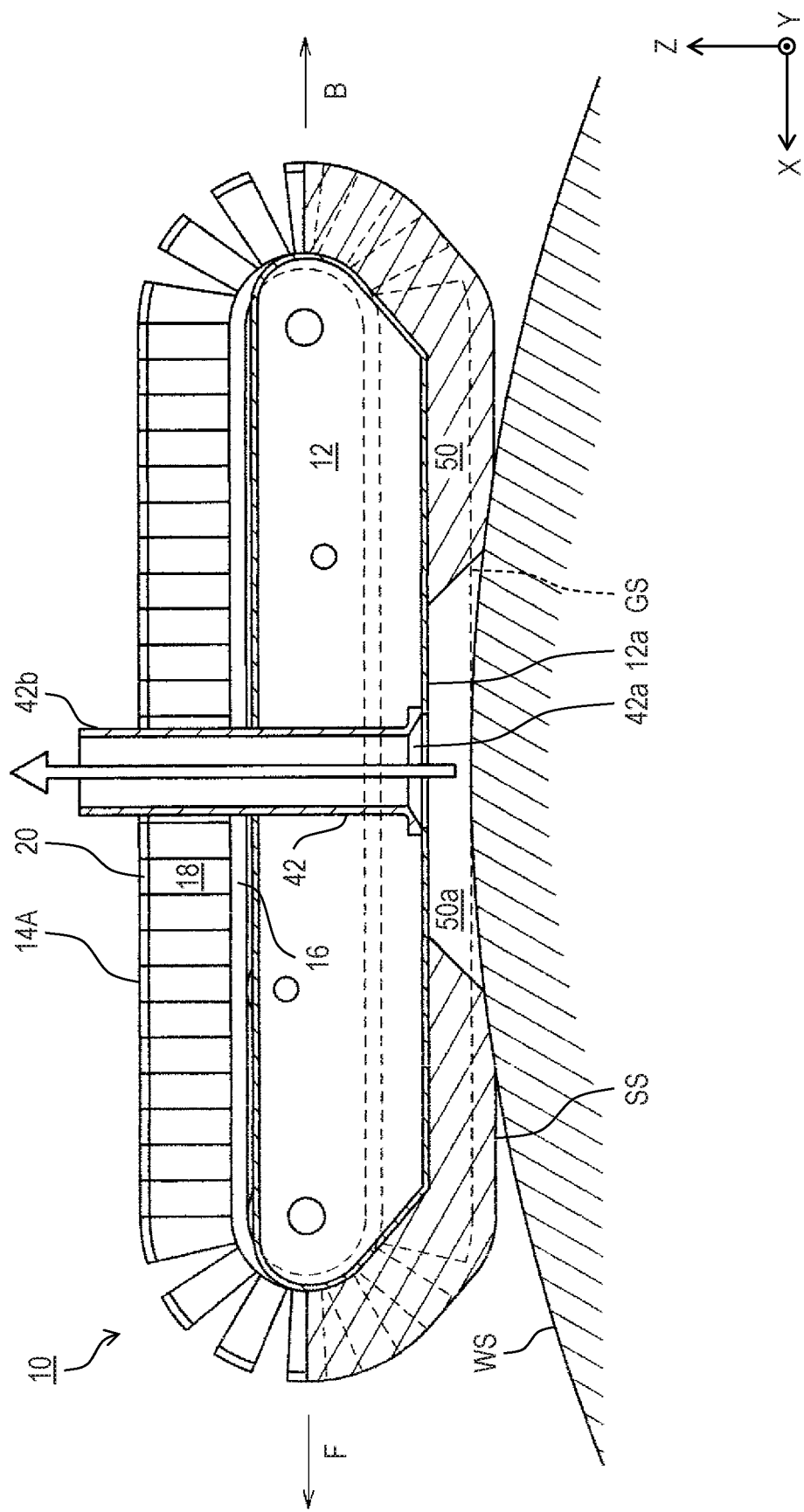
FIG. 6 is a cross-sectional view of the wall surface suction-type travel device according to the exemplary embodiment in which the wall surface suction-type travel device is suctioned on a curved wall surface.

FIG. 6 illustrates a cross section of wall surface suction-type travel device 10 that is suctioned on wall surface WS. As shown in FIG. 6, cushion 50 elastically deforms in response to contact with wall surface WS. As a result, an opening of through hole 50a in cushion 50 is closed by wall surface WS. This provides a space (an isolated space) that is isolated from outside air.

Suction device 40 draws air from through hole 50a forming the isolated space through suction nozzle 42 (indicated with a hollow arrow). As a result, the space of through hole 50a gets into a state of a negative pressure that is lower than atmospheric pressure. This causes cushion 50 to stick to wall surface WS. Wall surface suction-type travel device 10 in this state travels on wall surface WS while being suctioned on wall surface WS when first crawler 14A (as well as second crawler 14B) in contact with wall surface WS are rotated.

First and second elastic layers 18 and 20 of first crawler 14A (as well as second crawler 14B), and cushion 50 have predetermined elastic moduli to ensure that the wall surface suction-type travel device travels on wall surface WS while sticking to wall surface WS with increased reliability.

First elastic layer 18 is, for example, made of the elastic foam material (Rogers Inoac Corporation-made PORON H-24) and offers 0.08 MPa in 25% compression load deflection, an example elastic modulus. Second elastic layer 20 is, for example, made of the elastic foam material (Rogers Inoac Corporation-made NANEX TL4402) and offers 0.056 MPa in 25% compression load deflection. Cushion 50 is, for example, made of the elastic foam material (Bridgestone Corporation-made Everlight Moran #830) and offers 0.0017 MPa in 25% compression load deflection.

As described above, it is preferred that the elastic modulus of cushion 50 be lower than the elastic moduli of first and second elastic layers 18 and 20 of first crawler 14A (as well as second crawler 14B). In other words, in this exemplary embodiment, cushion 50 is lower in 25% compression load deflection than first and second elastic layers 18 and 20. Preferably, cushion 50 is more readily deformable than entire first crawler 14A. As contrasted with this, if the elastic modulus of cushion 50 is relatively high and the elastic modulus of first crawler 14A is relatively low, friction between cushion 50 and wall surface WS may be higher than friction between first crawler 14A and wall surface WS. If cushion 50 produces high friction, wall surface suction-type travel device 10 may be unable to travel smoothly or at all because of slipping first crawler 14A.

Even if the elastic modulus of cushion 50 is higher than the elastic moduli of first crawler 14A (as well as second crawler 14B), wall surface suction-type travel device 10 can travel smoothly with proviso that a smooth plastic film used to reduce friction against wall surface WS is, for example, stuck on slide surface SS of cushion 50 that slides on wall surface WS during traveling.

Next, as described above, it is preferred that in first crawler 14A (as well as second crawler 14B), the elastic modulus of first elastic layer 18 be higher than the elastic modulus of second elastic layer 20. In other words, in this exemplary embodiment, first elastic layer 18 is higher in 25% compression load deflection than second elastic layer 20. Preferably, thickness t1 of first elastic layer 18 is greater than thickness t2 of second elastic layer 20.

First crawler 14A (as well as second crawler 14B) are thus configured to enable wall surface suction-type travel device 10 to grip wall surface WS having unevenness with increased reliability and provide enhanced propulsion.

For instance, a crawler made from a material with a low elastic modulus provides an increased area of contact with a wall surface having unevenness (as compared with a crawler made from a material with a high elastic modulus). This increases grip force of the crawler on the wall surface.

However, if a crawler is made only from a material with a low elastic modulus, a large portion of force (energy) transmitted from the motor or another drive source to the crawler is consumed to deform the crawler. This decreases force of the crawler pushing the wall surface (i.e., propulsion).

First crawler 14A (as well as second crawler 14B) according to this exemplary embodiment are designed to combine grip force and propulsion and each include second elastic layer 20 disposed at an outermost side and first elastic layer 18 inside second elastic layer 20. The second elastic layer that is put into contact with wall surface WS has a relatively low elastic modulus, whereas the first elastic layer has a relatively high elastic modulus.

Thickness t1 of first elastic layer 18 is greater than thickness t2 of second elastic layer 20 in order to hinder the force transmitted from the motor or another drive source from being consumed for deformation of second elastic layer 20, in other words, to convert a large portion of the force transmitted from the drive source into propulsion. This configuration keeps an amount of deformation of second elastic layer 20 small and thus provides great propulsion.

First crawler 14A (as well as second crawler 14B) may not include a plurality of elastic layers having different elastic moduli, with proviso that the crawlers provide satisfactory grip force and propulsion. In some cases, such as a case in which a wall surface is elastically deformable, a crawler may be made from a material that does not substantially elastically deform. In other words, elastically deformable performance required for the crawler is determined depending on hardness of the wall surface, and as long as at least one of the crawler and the wall surface is elastically deformable, the wall surface suction-type travel device can provide satisfactory grip force and propulsion, with cushion 50 allowed to be put into contact with wall surface WS in a large area of contact.

In regard to contact between cushion 50 and wall surface WS, as shown in FIG. 6, slide surface SS of cushion 50 that slides on wall surface WS is located nearer to wall surface WS than grip surfaces GS of first crawler 14A (as well as second crawler 14B) that come into contact with wall surface WS are. In other words, as shown in FIG. 4, when wall surface suction-type travel device 110 is separated from wall surface WS and is under no strain, slide surface SS of cushion 50 is located outside grip surface GS of first crawler 14A. To put it another way, cushion 50 partly protrudes beyond first crawler 14A in the thickness direction (the Z-axis direction) (as shown in FIG. 4, when viewed along the width direction (the Y-axis direction).

Figure 7:
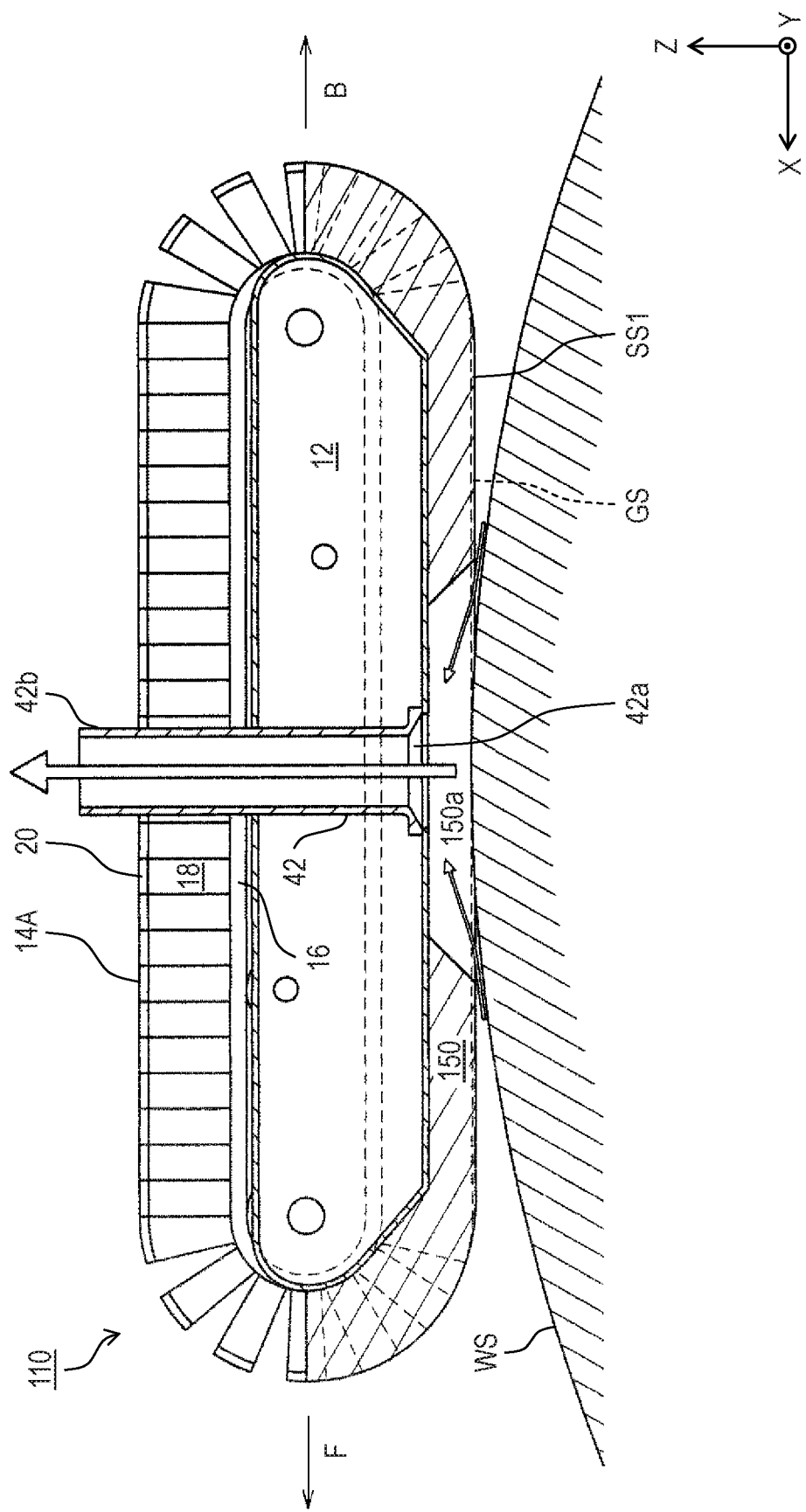
FIG. 7 is a cross-sectional view of a wall surface suction-type travel device according to a comparative example in which the wall surface suction-type travel device is unable to be suctioned on a curved wall surface.

FIG. 7 illustrates wall surface suction-type travel device 110 according to a comparative example different from the exemplary embodiment. In wall surface suction-type travel device 110 of this comparative example, slide surface SS1 of cushion 150 and grip surfaces GS of first crawler 14A (as well as second crawler 14B) are located substantially on an identical plane. In this case, as shown in FIG. 7, while the wall surface suction-type travel device is traveling on wall surface WS, i.e., a curved protruding surface, wall surface WS is not able to satisfactorily close an opening of through hole 150*a* in cushion 150. Even if a suction device draws air from through hole 150*a* through suction nozzle 42 (indicated with a hollow arrow) in this condition, air flows from an outside into through hole 150*a* through a gap between slide surface SS1 of cushion 150 and wall surface WS. As a result, wall surface suction-type travel device 110 of the comparative example is unable to be suctioned on curved protruding wall surface WS.

Consequently, as shown in FIG. 4, wall surface suction-type travel device 10 of this exemplary embodiment is configured such that slide surface SS of cushion 50 is located outside grip surfaces GS of first crawler 14A (as well as second crawler 14B) when the wall surface suction-type travel device is separated from wall surface WS and is under no strain. This configuration enables wall surface suction-type travel device 10 to travel on wall surface WS while being reliably suctioned on curved protruding wall surface WS.

As shown in FIG. 4, distance d between slide surface SS of cushion 50 under no strain and grip surfaces GS of first crawler 14A (as well as second crawler 14B) is determined depending on factors such as a size of the opening of through hole 50*a* and a radius of curvature of wall surface WS. For instance, if the size of the opening of through hole 50*a* is 100 mm×100 mm and the radius of curvature of wall surface WS is 800 mm, distance d is set to 15 mm.

As shown in FIG. 4, since slide surface SS of cushion 50 is at a more outer position than a position of grip surfaces GS of first crawler 14A in wall surface suction-type travel device 10 (as well as second crawler 14B), it is preferred that cushion 50 have front inclined surface 50*b* and rear inclined surface 50*c* to accommodate unevenness, if any, on wall surface WS.

Specifically, cushion 50 has front inclined surface 50*b* at a front end part. Front inclined surface 50*b* is inclined relative to wall surface WS such that Front inclined surface 50*b* is farther away from wall surface WS (technically, a planar wall surface put into contact with slide surface SS) as closer to a front distal end of cushion 50 (in direction F). Cushion 50 also has rear inclined surface 50*c* at a rear end part. Rear inclined surface 50*c* is inclined relative to wall surface WS such that Rear inclined surface 50*c* is farther away from wall surface WS as closer to a rear distal end of cushion 50 (in direction B).

This configuration allows cushion 50 to avoid getting caught on any projection on wall surface WS and thus get over the projection if unevenness exists on wall surface WS. Hence, wall surface suction-type travel device 10 is able to smoothly travel on wall surface WS having unevenness.

Wall surface suction-type travel device 10 according to the present exemplary embodiment described above is able to travel on curved wall surface WS while being suctioned on curved wall surface WS.

Exemplary embodiments of the present disclosure are not limited to the exemplary embodiment described above.

For instance, in the exemplary embodiment described above, as shown in FIG. 1, wall surface suction-type travel device 10 has two crawlers, i.e., first crawler 14A and second crawler 14B. However, the exemplary embodiments of the present disclosure are not limited to this example. A wall surface suction-type travel device may have at least one crawler to travel on a wall surface.

For instance, in the exemplary embodiment described above, as shown in FIG. 2, wall surface suction-type travel device 10 has one draw-in port 42*a*. However, the exemplary embodiments of the present disclosure are not limited to this example. A wall surface suction-type travel device may have at least one draw-in port such that the wall surface suction-type travel device is suctioned on a wall surface.

In the exemplary embodiment described above, as shown in FIG. 4, first crawler 14A (as well as second crawler 14B) each include two layers, i.e., first elastic layer 18 having a relatively high elastic modulus and second elastic layer 20 having a relatively low elastic modulus. However, the exemplary embodiments of the present disclosure are not limited to this example. In place of first and second elastic layers 18 and 20, a crawler may include one elastic layer made of an elastic foam body that decreases in material density (i.e., increases in air density) with an increase in distance from base belt 16.

Further, in the exemplary embodiment described above, as shown in FIG. 5, suction device 40 such as a suction pump is disposed separately from wall surface suction-type travel device 10. However, the exemplary embodiments of the present disclosure are not limited to this example. A suction pump may be mounted on main body 12 in wall surface suction-type travel device 10. This instance eliminates the need for a flexible hose used to connect the wall surface suction-type travel device to the suction pump separate from the wall surface suction-type travel device. This enables the wall surface suction-type travel device to travel without being restricted by the flexible hose. As a result, the wall surface suction-type travel device provides increased flexibility in traveling.

In other words, in a broad sense, an exemplary embodiment according to the present disclosure is a wall surface suction-type travel device capable of traveling on a wall surface while being suctioned on the wall surface. The wall surface suction-type travel device includes a main body, a cushion, a plurality of support wheels disposed on the main body, a crawler equivalent to an endless belt suspended on the plurality of the support wheels and put into contact with the wall surface during traveling, and a drive source to rotate the crawler. The main body includes a wall-surface facing section facing the wall surface and a draw-in port being formed in the wall-surface facing section and being connected to a suction device. The cushion is disposed on the wall-surface facing section of the main body so as to surround an edge of the draw-in port. The cushion is elastically deformable and slides on the wall surface during traveling. A slide surface of the cushion configured to slide on the wall surface during traveling is located outside a grip surface of the crawler configured to be put into contact with the wall surface during traveling when the wall surface suction-type travel device is separated from the wall surface and is under no strain.

As described above, the exemplary embodiment has been described as an example of the technique in the present disclosure. For this purpose, the accompanying drawings and the detailed description have been provided. Accordingly, in order to illustrate the above technique, the components described in the accompanying drawings and the detailed description may include not only components that are essential for solving the problem but also components that are not essential for solving the problem. For this reason, it should not be immediately deemed that those unessential components are essential just because those unessential components are described in the accompanying drawings and the detailed description.

Since the above-described exemplary embodiment is intended to exemplify the technique according to the present disclosure, various modifications, replacements, additions, and omissions can be made within the scope of the appended claims or of their equivalents.

INDUSTRIAL APPLICABILITY

The present disclosure is applicable to a device that travels on a wall surface while being suctioned on the wall surface.

REFERENCE MARKS IN THE DRAWINGS 10, 110: wall surface suction-type travel device
12: main body
12a: wall-surface facing section
14A: crawler (first crawler)
14B: crawler (second crawler)
16: base belt
18: first elastic layer
20: second elastic layer
22: support wheel (front support pulley)
24: support wheel (rear support pulley)
40: suction device
42a: draw-in port
44: flexible hose
50, 150: cushion
50b: front inclined surface
50c: rear inclined surface
SS, SS1: slide surface
GS: grip surface
WS: wall surface

The invention claimed is:

1. A wall surface suction-type travel device configured to travel on a wall surface while being suctioned on the wall surface, the wall surface suction-type travel device comprising:
a main body that includes a wall-surface facing section and a draw-in port, the wall-surface facing section facing the wall surface when the wall surface suction-type travel device travels on the wall surface, the draw-in port being formed in the wall-surface facing section and being connected to a suction device;
a cushion disposed on the wall-surface facing section of the main body and surrounding an edge of the draw-in port, the cushion being elastically deformable and having a slide surface sliding on the wall surface when the wall surface suction-type travel device travels on the wall surface;
a plurality of support wheels disposed on the main body;
a crawler that is an endless belt suspended on the plurality of support wheels, the crawler having a grip surface put into contact with the wall surface when the wall surface suction-type travel device travels on the wall surface; and
a drive source to rotate the crawler,
wherein the slide surface of the cushion is at a more outer position than a position of the grip surface of the crawler in the wall surface suction-type travel device when the wall surface suction-type travel device is separated from the wall surface and is under no strain,
wherein the crawler is elastically deformable, and
wherein an elastic modulus of the cushion is lower than an elastic modulus of the crawler.

2. The wall surface suction-type travel device according to claim 1, wherein the crawler is elastically deformable in a thickness direction.

3. The wall surface suction-type travel device according to claim 1, wherein the crawler comprises:
a base belt suspended on the plurality of support wheels;
a first elastic layer disposed on the base belt; and
a second elastic layer being disposed on the first elastic layer and being put into contact with the wall surface, and
wherein an elastic modulus of the first elastic layer is higher than an elastic modulus of the second elastic layer.

4. The wall surface suction-type travel device according to claim 3, wherein a thickness of the first elastic layer is greater than a thickness of the second elastic layer.

5. The wall surface suction-type travel device according to claim 3, wherein each of the first elastic layer and the second elastic layer of the crawler is divided into a plurality of parts arranged along a direction in which the crawler is elongated.

6. The wall surface suction-type travel device according to claim 1, wherein the cushion has a front end part and a rear end part that are opposed to each other in a direction along which the wall surface suction-type travel device travels,
wherein the cushion has a front inclined surface at the front end part, the front inclined surface being inclined relative to the wall surface in such a way that the front inclined surface is farther away from the wall surface as closer to a front distal end of the cushion, and
wherein the cushion has a rear inclined surface at the rear end part, the rear inclined surface being inclined relative to the wall surface in such a way that the rear inclined surface is farther away from the wall surface as closer to a rear distal end of the cushion.

7. The wall surface suction-type travel device according to claim 1, wherein the draw-in port of the main body is connected via a flexible hose with the suction device disposed separately from the wall surface suction-type travel device.

8. The wall surface suction-type travel device according to claim 1, wherein the draw-in port of the main body is connected to the suction device mounted on the main body.

* * * * *